US010623817B1

(12) United States Patent
Gravino et al.

(10) Patent No.: US 10,623,817 B1
(45) Date of Patent: Apr. 14, 2020

(54) CREATION OF A VIRTUAL DVR FROM A SYNCHRONIZED LOCAL DVR AND NETWORK DVR

(71) Applicant: Cox Communications, Inc., Atlanta, GA (US)

(72) Inventors: Douglas D. Gravino, Roswell, GA (US); Slavisha Karach, Alpharetta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/162,359

(22) Filed: Jan. 23, 2014

(51) Int. Cl.
| H04N 21/262 | (2011.01) |
| H04N 21/472 | (2011.01) |
| H04N 21/274 | (2011.01) |
| H04N 21/4147 | (2011.01) |
| H04N 21/433 | (2011.01) |
| H04N 21/61 | (2011.01) |
| H04N 21/6377 | (2011.01) |

(52) U.S. Cl.
CPC ..... H04N 21/47214 (2013.01); H04N 21/262 (2013.01); H04N 21/274 (2013.01); H04N 21/4147 (2013.01); H04N 21/4334 (2013.01); H04N 21/6175 (2013.01); H04N 21/6377 (2013.01)

(58) Field of Classification Search
CPC ............................................... H04N 21/42201
USPC .......................................................... 725/58
See application file for complete search history.

(56) References Cited

U.S. PATENT DOCUMENTS

| 2002/0100052 A1* | 7/2002 | Daniels ................ G11B 27/024 725/87 |
| 2003/0219228 A1 | 11/2003 | Thiagarajan et al. |
| 2004/0113929 A1 | 6/2004 | Matsuzaki |
| 2007/0276925 A1* | 11/2007 | La Joie .............. G06Q 30/0256 709/219 |
| 2008/0275974 A1* | 11/2008 | Rackiewicz .......... H04L 67/306 709/223 |
| 2009/0010610 A1* | 1/2009 | Scholl .................. G11B 27/105 386/314 |
| 2010/0043030 A1 | 2/2010 | White |
| 2010/0251289 A1* | 9/2010 | Agarwal ................. H04N 7/16 725/34 |
| 2012/0151528 A1 | 6/2012 | Mathews et al. |

(Continued)

Primary Examiner — Jefferey F Harold
Assistant Examiner — Omer Khalid
(74) Attorney, Agent, or Firm — Merchant & Gould P.C.

(57) ABSTRACT

Creating a virtual DVR from a synchronized local DVR and network DVR is provided. Oftentimes, video content recorded one a local DVR may be inaccessible for playback from an internet connected device. When a request to record a video content item is received, the request is synchronized between a local DVR and a network DVR. Accordingly, the video content item is recorded on both DVRs. If a playback request is received from a device in communication with the local DVR, the local DVR recording may be played from; and if an internet connected device is used for playback, the network DVR recording may be played. Further, the data and the metadata of the recorded content including bookmarks, viewing history, deletion requests, etc. may be synchronized. Appropriate advertising may also be inserted/replaced based on the time/location of viewing, the playback device, user profile data, etc.

15 Claims, 5 Drawing Sheets

(56) References Cited

U.S. PATENT DOCUMENTS

| | | |
|---|---|---|
| 2014/0282772 A1* | 9/2014 | Chen ................ H04N 21/26258 |
| | | 725/97 |
| 2014/0282786 A1 | 9/2014 | Lajoie |
| 2015/0026125 A1 | 1/2015 | Sharma |
| 2015/0052549 A1* | 2/2015 | Teixeira ............... H04N 21/812 |
| | | 725/32 |
| 2015/0205657 A1 | 7/2015 | Clark |
| 2016/0360282 A1 | 12/2016 | Graham et al. |

* cited by examiner

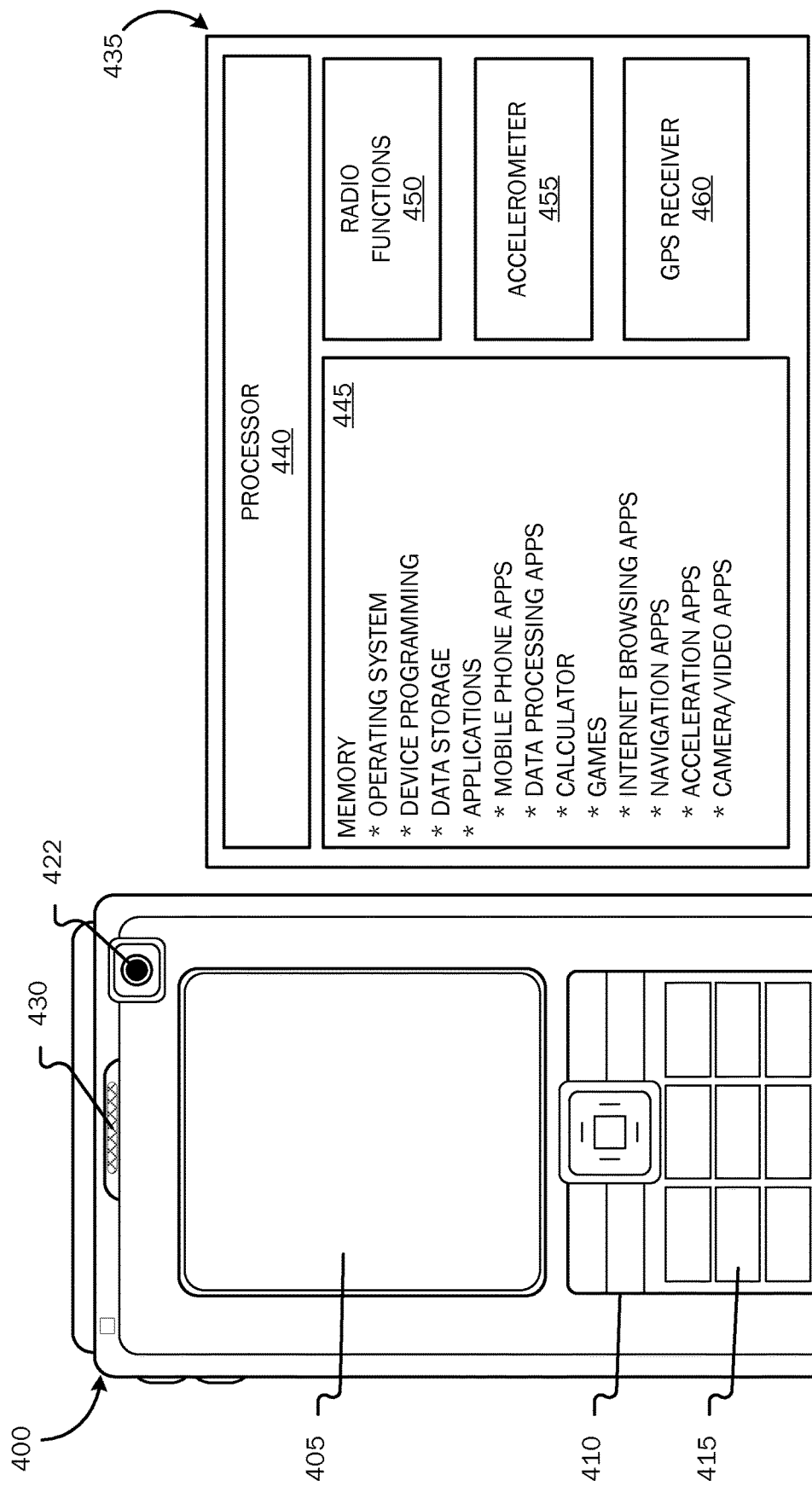

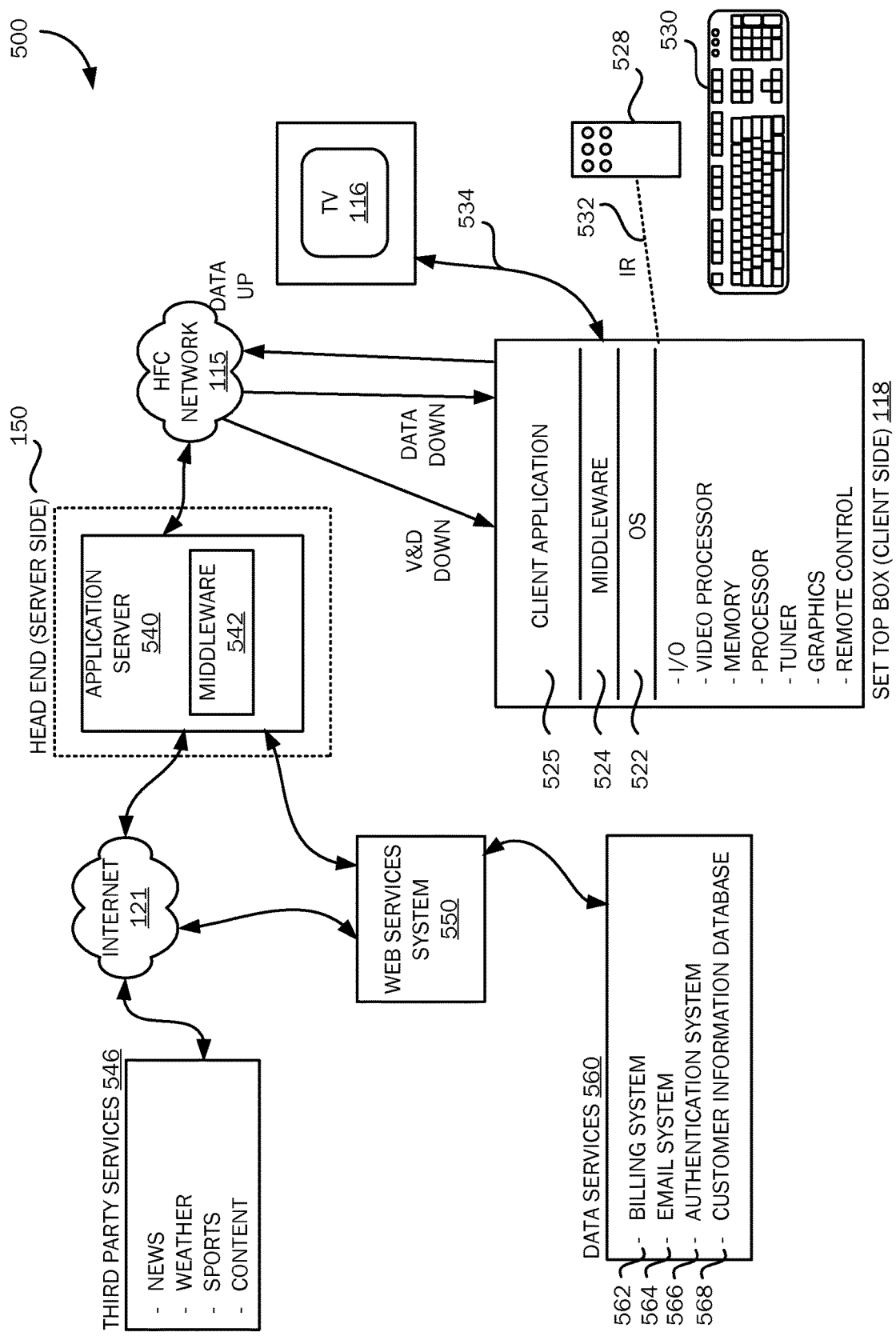

CREATION OF A VIRTUAL DVR FROM A SYNCHRONIZED LOCAL DVR AND NETWORK DVR

BACKGROUND

Video consumers are increasingly utilizing digital video recorders (DVRs, also known as "personal video recorders", or PVRs) to record video content for later viewing. In addition, users are increasingly using both computers and mobile Internet Protocol (IP) devices such as smartphones and tablets to consume video content both in and out of their homes. One frequent frustration for many users may be that video content recorded on a typical in-home DVR may not easily be viewable on computers or portable devices for a variety of reasons. For example, DVRs often tend to be "legacy" devices that may record video in proprietary or non-portable formats, may not have output ports or protocols to allow for connection to other devices, and may encode video recordings with management software, for example the digital rights management (DRM) software, which may prevent the content from being playable outside the specific DVR device.

Network-based DVRs, which record television programming on a service provider's centralized network, have been used as a method for overcoming these limitations since modern network DVR services are often specifically designed to work with mobile devices; however, for users who may already have a DVR at home or a DVR that is integrated with a cable/Telco set-top box and who may not have additional interface devices to connect their home television set (TV) to network-based DVR services, this method may be equally incompatible for them since they may have no way to play back the network DVR content on their usual TV screens.

It is with respect to these and other considerations that the present invention has been made.

SUMMARY

Embodiments of the present invention provide for creating a virtual DVR from a synchronized local DVR and network DVR. Embodiments comprise utilizing both a local DVR in a user's home and network DVR services to simultaneously serve recorded video content to both home televisions with legacy DVRs/STBs and to mobile IP devices in a seamless manner. As should be appreciated, the term "mobile IP devices" refers to devices directly capable of displaying IP video (e.g., handheld gaming device or a smart phone etc.) or other devices that may be capable of converting an IP video into a viewable format for display (e.g., internet video streaming devices). There may be no need for users to set up separate recordings or to perform complicated file transfers. This combination of the local DVR and network DVR may appear like one coherent virtual DVR.

According to embodiments, when a recording request is sent to either a local DVR or to a network-based DVR, recordings may occur independently and simultaneously on both the local and network DVR systems. Playback of the recording may be requested from either the local DVR (e.g., via a set top box connected to a TV) or from the network DVR (e.g., via a mobile IP device).

Embodiments of the present invention may also allow for status information for DVR recordings to be shared and dynamically synchronized across the local and network DVR systems. For example, if a user starts viewing a recording on his/her mobile device from the network DVR, state information about the status of the recording and metadata regarding the recording may be exchanged between the network DVR and the local DVR such that the user may finish viewing the recording from where he/she left off later on his/her home TV from the local DVR. Furthermore, embodiments of the present invention may also allow service providers to be aware of the location and circumstances under which a user may be viewing recorded content. Accordingly, a service provider may insert different advertisements depending on such factors as the time of viewing, location of the device, etc.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

Referring now to the drawings in which like reference numbers represent corresponding parts throughout:

FIGS. 4A-4B illustrate a suitable mobile computing environment with which embodiments may be practiced; and FIG. 5 is a simplified block diagram illustrating a cable television services system architecture providing an operating environment according to an embodiment.

DETAILED DESCRIPTION

Figure 1:
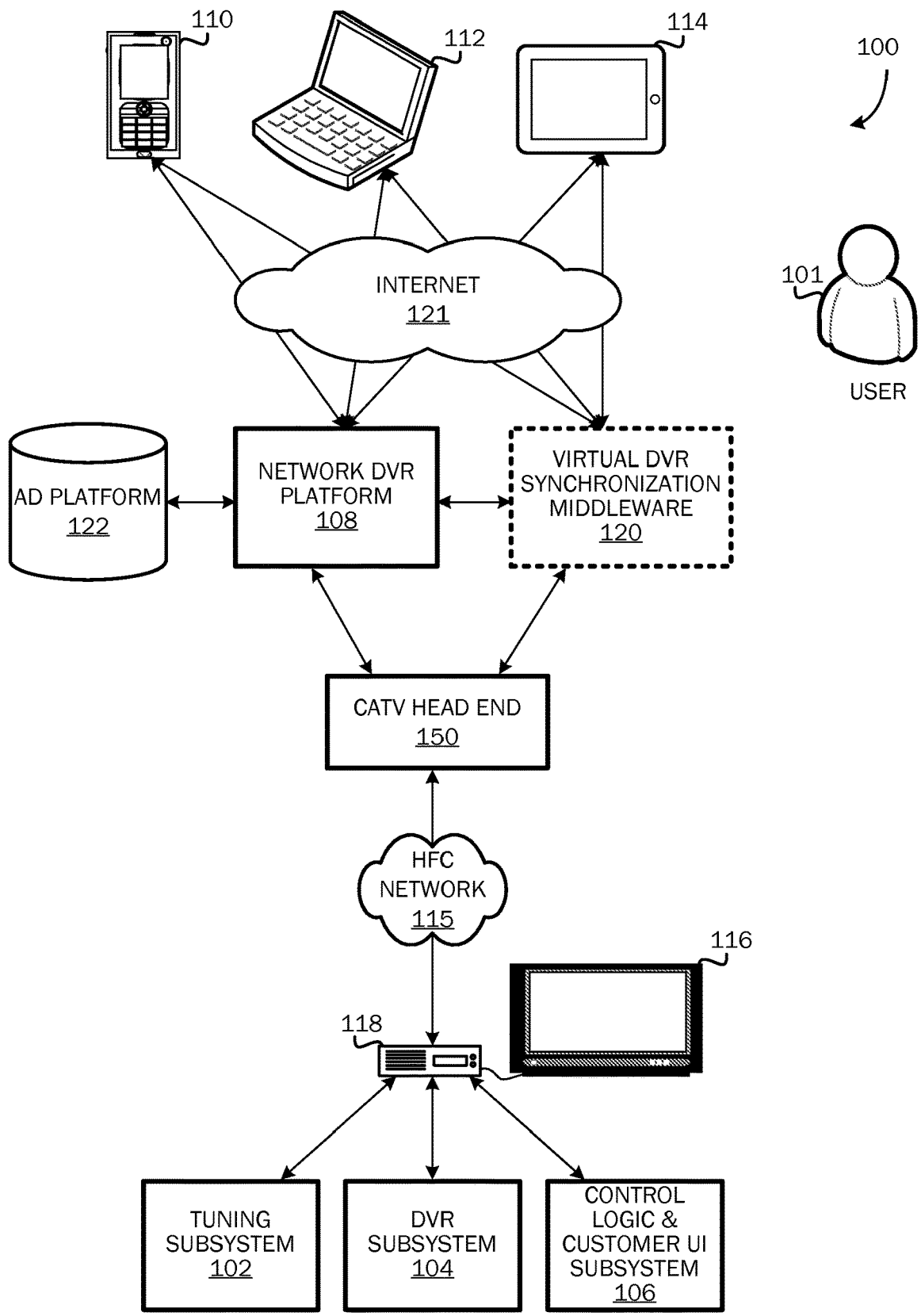
FIG. 1 is a simplified block diagram illustrating a system for creating a Virtual DVR from a synchronized Local DVR and a Network DVR.

Embodiments provide for creating a virtual DVR from a synchronized local DVR and a network DVR. Current generation local DVRs in users' homes, especially DVRs embedded in typical cable multiple system operator (MSO) or Telco set-top boxes (STB), are oftentimes designed to make it difficult, if not almost impossible, for users to get recorded content off the local device and onto a second device out of concern of unauthorized use of the recorded content. Even if content is decrypted and moved off the DVR, the file formats and codecs used to encode the video may often be incompatible with most common mobile devices, and the "transcoding" step which may be necessary to convert the video may be time-consuming and cumbersome from a consumer perspective. At the same time, the limited hardware/software/network capability of most DVRs may make it difficult for them to be upgraded to function as playback devices for content recorded on network DVRs. Accordingly, if a user desires to use a network DVR exclusively, he/she may need to purchase a new set-top box or other device to allow streaming of recorded content from the network onto his/her home TV. This sort of wide-scale replacement of still-functional legacy DVRs may be an enormous expense for most service providers and a large imposition on users.

Existing control systems for existing local DVRs may be modified such that a simultaneous network DVR recording may be triggered upon receiving an indication of any recording done on the local DVR. Similarly, the network DVR may remotely trigger recording on the local DVR. The result is that users and service providers may not need to replace existing DVRs, but yet may be able to consume recorded content from whichever DVR system (local DVR or network DVR) may be best for their current output device. If a user is viewing video content on his/her home TV, video playback may be done from the local DVR. If a user is viewing video content from a mobile device, video playback may be done from the network DVR.

Another important use of a "virtual DVR" may be for service providers as part of a migration strategy to a future all-network DVR-based system. Subscribers of the service provider may be able to take advantage of the benefits of network DVR for mobile devices, while older STBs with local DVRs are being phased out and replaced by new STBs which may be capable of working directly with the network DVR system.

From an advertising perspective, broadcast television typically may have broadly targeted and often time-sensitive advertisements. When a DVR recording of broadcast television containing such advertisements is viewed at a later date, for example, days or weeks later, the time-relevancy of those advertisements may be lost (e.g., advertisements for upcoming TV shows that are now in the past, advertisements for holiday sales that are now over, etc.). Additionally, viewership measurement data associated with advertisements may be valid for a specified time period after airing. Therefore, if a DVR recording is viewed after the specified time period, the viewership measurement data associated with advertisements in the recording may be of little to no value. According to embodiments of the present invention, targeted advertisements may be dynamically inserted at a time of playback, which may extend the value of viewership measurement data and provide users with relative advertisements.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Referring now to FIG. 1, a simplified block diagram illustrating a system 100 for creating a virtual DVR from a synchronized local DVR and a network DVR is shown. The system 100 may comprise various system-level and user-level components. User-level components may include a set-top box (STB) 118 connected to or integrated with a television set 116 used to display video content output of the STB 118. According to embodiments, the STB 118 may comprise a tuning subsystem 102, which may contain control logic and user interface (UI) subsystem 106, and communications interfaces to communicate with a network DVR platform 108 for tuning and viewing live content from various video delivery systems, for example, an antenna based video delivery system, a cable, satellite, or fiber optic delivery system, etc.

The STB 118 may comprise or may be in communication with a DVR subsystem 104. The DVR subsystem 104 may contain logic and storage for recording television programming and to play back the recorded content when requested by a user. According to an embodiment, the DVR subsystem 104 may perform virtual DVR synchronization or may communicate with a middleware server that controls synchronization. The DVR subsystem 104 may also interact with the tuning subsystem 102 for display of content from the video delivery system.

The STB 118 may also comprise a control logic and user interface subsystem 106, which may control STB 118 functionality, provide user messaging, etc. According to an embodiment, the control logic and user interface subsystem 106 may interact with the DVR subsystem 104 for user configuration and control.

The system 100 may comprise various system level components, which may include one or more network DVR platform(s) 108, wherein a network DVR platform 108 is a system which may record and store video content on one or more remote servers, and may be enabled to perform DVR services for multiple users and multiple channels simultaneously. As is known to those skilled in the art, these systems may be available commercially through multiple vendors or may be built in-house by large technical organizations. The content may be distributed over switched digital video channels or via Internet Protocol (IP).

According to an embodiment, a centralized control system may be provided for controlling creation of a virtual DVR. A centralized control system may include a system-level VDSM 120, which may be operable to perform such functions as coordinating/scheduling recordings, playback, and synchronization functions. According to this embodiment, managing user bookmarks, deleting recordings, managing parental controls, synchronizing metadata, and other functions that will be described below with respect to a flow chart illustrated in FIG. 2 may be managed centrally by the VDSM 120. The appropriate commands for DVR functionalities may be sent to the local and network DVRs for execution. A centralized control system may make the synchronization of activities more consistent due to its authoritative nature.

According to another embodiment, a localized control system may be provided. In a localized control system, a centralized system controller (VDSM 120) may or may not be included. Local control logic 106, a DVR subsystem 104, and a tuning subsystem 102 associated with each STB 118 may be operable to perform functions of managing user bookmarks, deleting recordings, synchronizing data and metadata (e.g. synchronizing deletion of a video content item, bookmarks, parental controls, recording settings, upcoming recording requests, viewing history data etc.), etc. Although the local DVR and the network DVR may operate independently, they may be in communication to synchronize operations and management. For example, if a user 101 sets a recording on a local DVR for 10:00 PM, consumes program X up to the 10 min 5 sec mark on the local DVR, and deletes program Y from the local DVR, etc., the active system (the local DVR) may inform the non-active system (a network DVR) of its activities (e.g., the local DVR tells the network DVR to also record at 10:00 PM, communicates the current bookmark for program X is at the 10 min 5 sec mark, and tells the network DVR to delete program Y, etc.). Current end-point devices or sub-systems that may be designed to work with standard local DVRs or standard network DVRs may need minimal, if any, redesign to work with a localized control system.

According to another embodiment, a hybrid system, which may be a combination of one or more components of the centralized control system and the localized control system, may be provided. As can be appreciated, a system for creating a virtual DVR from a synchronized local DVR and network DVR may be implemented in various ways without detracting from the fundamental ideas and steps.

An advertisement insertion/management platform (ad platform) 122 may also be provided within the system 100 to tailor the advertising seen by the user to the circumstances of playback, given that any particular piece of video content may be played back on a variety of devices (110, 112, 114) at potentially various locations and at different date/times. According to an embodiment, the ad platform 122 may include a rules engine which may be operable to analyze agreements with various $3^{rd}$ party advertising partners and to insert the appropriate advertisements based on such factors as a time of viewing, a location of the viewing device, a user's demographic profile information, etc.

Figure 2:
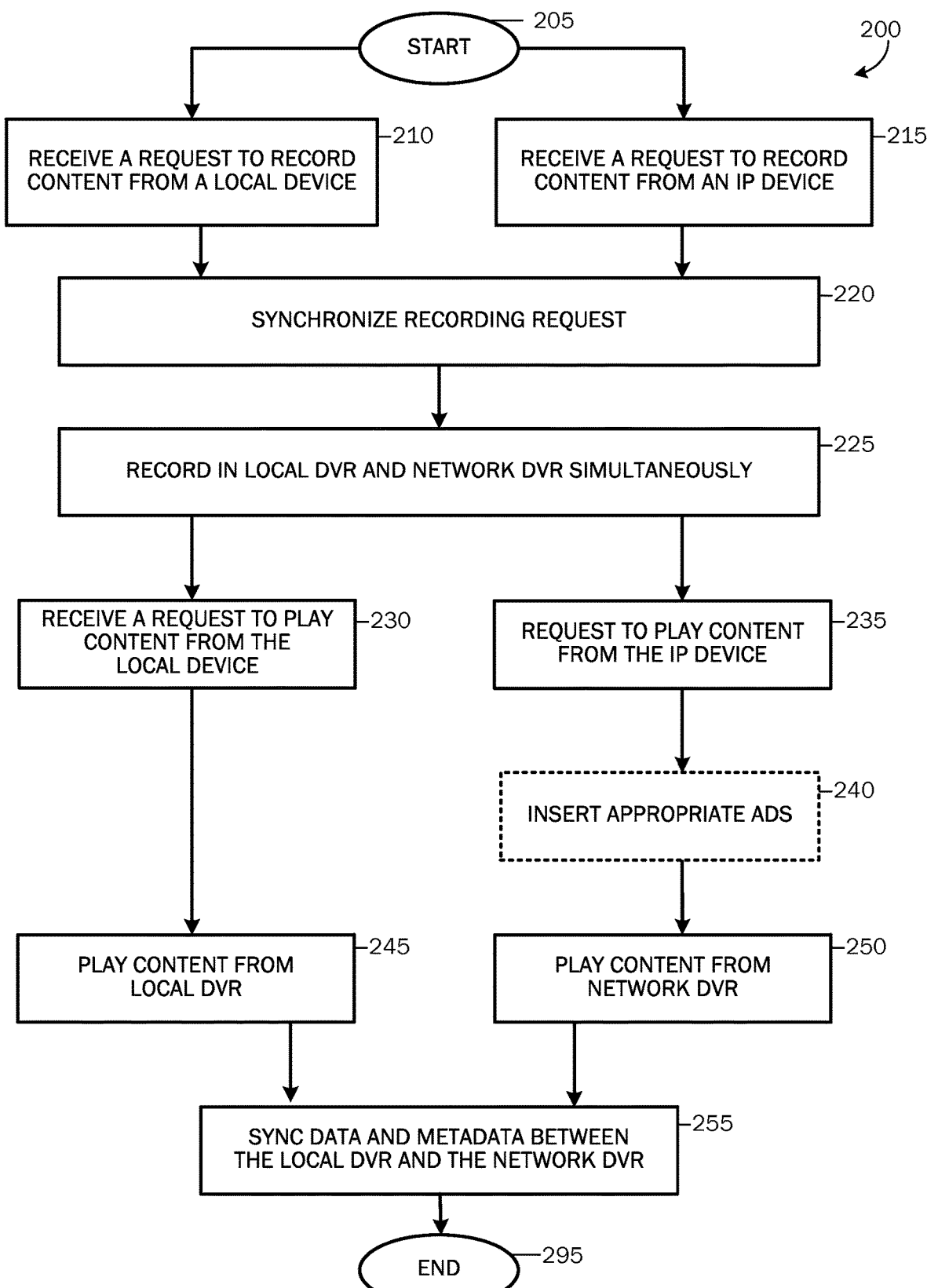
FIG. 2 is a flow chart of a method for creating a Virtual DVR from a synchronized Local DVR and a Network DVR according to an embodiment.

Having described a system architecture 100, FIG. 2 is a flow chart of a method for creating a virtual DVR from a synchronized local DVR and network DVR according to an embodiment. The method 200 may begin at START OPERATION 205, and may proceed to OPERATION 210, where a recording request may be received by a device in communication with or integrated with a local DVR, for example, a set top box 118, or may proceed to OPERATION 215, where a recording request may be received from an IP device in communication with a network DVR. As mentioned earlier, as used herein, an "IP device" may refer to a device directly capable of displaying IP video (e.g., handheld gaming device or a smart phone etc.) or other device that may be capable of converting an IP video into a viewable format for display (e.g., internet video streaming devices). The request may be a request to record a video content item to the local DVR (OPERATION 210) or to the network DVR (OPERATION 215).

The method 200 proceeds from OPERATION 210 or OPERATION 215 to OPERATION 220 where the received recording request is synchronized. According to an embodiment, a recording request made to the local DVR may be automatically synchronized to the network DVR, and any request made directly to the network DVR may be similarly synchronized to the local DVR. With a centralized control system, the recording request may be synchronized with the local DVR and network DVR via the VDSM 120 as described above. Alternatively, with a localized control system, the recording request may be communicated from the DVR on which the request is received to the non-active DVR. For example, in OPERATION 210, the request to record content to a local DVR may be communicated to the network DVR; and in OPERATION 215, the request to record content to a network DVR may be communicated to the user's local DVR. The communication may be pushed to the non-active DVR, or alternatively, the non-active DVR may make a recording request query about upcoming recordings, check recording status, etc. In addition to synchronizing recording requests, metadata in a database that may be located within the same synchronization system may also be synchronized.

The method 200 then proceeds to OPERATION 225 where the video content item may be independently and simultaneously recording in both the local and network DVRs. Each device may encode τ and save the recorded video data using its own codecs, formats, and protocols. Further appropriate additions may be made to the catalog which may contain metadata organized in a logical manner such that each device may be able to determine the location of the recordings. For example, in a case when a recording fails, the local or network device may reference the catalog to determine the location of the recording The method 200 may then proceed to OPERATION 230, where a user may desire to consume a previously recorded video content item from a device connected to the local DVR, such as a set top box 118, or to OPERATION 230, where a user may desire to view a previously recorded video from an IP device in communication with the network DVR, such as a mobile phone/smart phone 110, a tablet/slate computer 114, or a laptop/personal computer 112. The device which received the recording request may contact a determined appropriate DVR recording system to retrieve the content. For example, if the user 101 requests to play a previously recorded video content item (OPERATION 230) on his living room TV using his local STB with integrated or communicatively attached DVR on his living room TV, the most appropriate DVR to use for playback may be the local DVR, wherein the video may stream off the local DVR and onto the TV. On the other hand, if the user requests content to be played using a device such as a computer 112, tablet 114, or smartphone device 110 (OPERATION 235), the most appropriate DVR to use for playback may be the network DVR, wherein the content may stream off the network DVR and onto the computer 112, tablet 114, or smartphone device 110. According to an embodiment, OPERATION 235 may involve a security mechanism to prevent users from simply sharing login or other authentication information that may allow friends or extended family members, who may not be subscribed, to see the recorded video content except under potentially controlled circumstances.

The method 200 may then proceed from OPERATION 235 to optional OPERATION 240. OPERATION 240 is an optional advertising replacement/insertion step, supported by the ad platform 122 illustrated in FIG. 1. Given that any particular piece of video content may be played back on a variety of devices at potentially various locations and at different date/times, it may be desirable for an advertisement insertion/management platform 122 to tailor the advertising seen by the user to the circumstances of playback. For example, if a user is at home and viewing content on either a TV or a computer at dinnertime, the rules engine in the advertisement platform may insert a food delivery commercial for a local restaurant, whereas if the user were viewing the same program on a tablet computer in a city different from the city than where he/she lives, a commercial for a different restaurant may be more appropriate and may be inserted. According to an embodiment, location information may also be extensible to $3^{rd}$ party advertising partners who may incorporate a specific location, specific user demographics, etc. to make recommendations for TV/movie content-related merchandising. For example, an advertisement may be inserted advertising a dress seen in a show available at a specific retailer in the user's current city, etc. The advertisement insertion/management platform 122 may be integrated with both the local 104 and network DVR systems 108, and may be aware of the contextual playback information from both local and network DVR systems to choose the right advertisement to provide to the user. The method 200 may then proceed to OPERATION 245 where the content is played from the local DVR or to OPERATION 250 where the content is played from the network DVR. As described above, the device which received the recording request may contact a determined appropriate DVR recording system to retrieve the content.

The method 200 then may proceed to OPERATION 255 where playback information is synchronized and management functions are performed between the local DVR and network DVR. Synchronization may comprise an exchange of state information about the status of various recordings and the metadata regarding those recordings on the two systems to keep them in synch. For example, a user may want to be able to start viewing a recorded program via his/her home TV from his/her local DVR, pause the program, and then start viewing the program again where he/she left off via their smartphone or other device from the network DVR. Similarly, when the same user finishes viewing the program via his/her smartphone and deletes the program from the network DVR, the network DVR may be synchronized with the local DVR so that the program is deleted on both the network DVR and the local DVR. According to an embodiment, OPERATION 255 may also occur at other times not associated with playback. For example, the local DVR may have access to metadata about recorded programs that may not be available to the network DVR (e.g., a cast & crew photo, episode number/title, description, actor information, etc.). Accordingly, synchronization between the local DVR and the network DVR may include an exchange of program metadata. Other possible data that may be synchronized may include items such as recording cancellations, "undeleting" accidentally deleted programs, setting common policies on how long to keep programs before they are eligible to be overwritten, user controls such as parental controls, concurrency (viewing the same recording via network and from local storage), etc.

According to another embodiment, the local and remote DVRs may not be in a completely synchronous state. For example, if the user's local DVR has less storage space available than the network DVR, more recorded content may be stored on the network DVR. Older recordings may be moved into a "network DVR only" status where they may not be available on the local DVR for playback, but the consumer may be able see on his/her local DVR that the recordings are still available on the network for playback using an IP device such as a computer or tablet. Embodiments may provide for many permutations of options available, and the above examples and embodiments should not be taken as an exhaustive list.

The method 200 may end at OPERATION 295.

Figure 3:
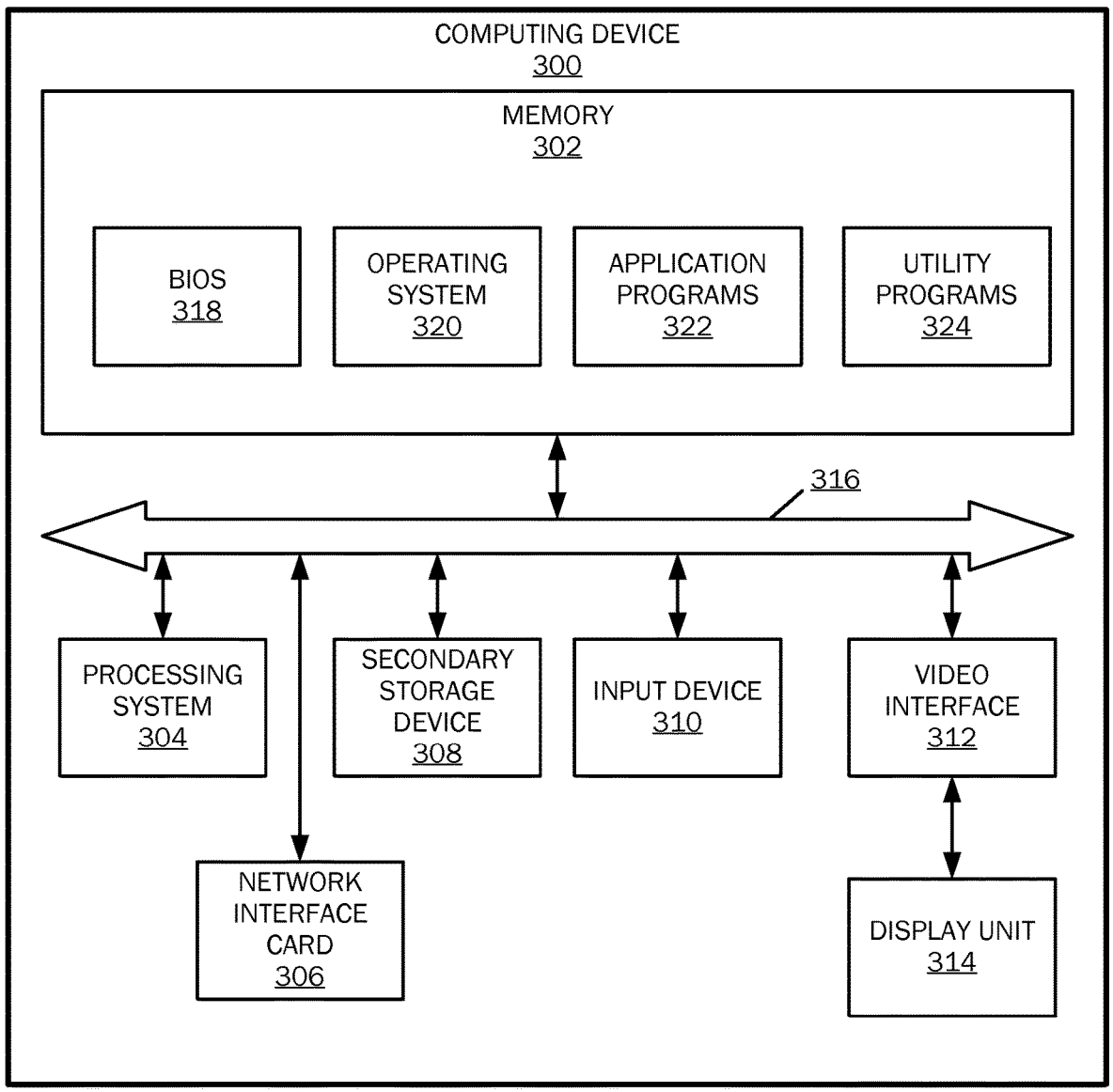
FIG. 3 is a block diagram illustrating example physical components of a computing device with which embodiments may be practiced.

FIG. 3 is a block diagram illustrating example physical components of a computing device 300 with which embodiments may be practiced. In some embodiments, one or a combination of the components of the system 100 may be implemented using one or more computing devices like the computing device 300. It should be appreciated that in other embodiments, one or a combination of the components of system 100 may be implemented using computing devices having hardware components other than those illustrated in the example of FIG. 3.

Computing devices may be implemented in different ways in different embodiments. For instance, in the example of FIG. 3, the computing device includes a processing system 304, memory 302, a network interface card 306, a secondary storage device 308, an input device 310, a video interface 312, a display unit 314, and a communications medium 316. In other embodiments, the computing device 300 may be implemented using more or fewer hardware components (e.g., a video interface, a display unit, or an input device) or in combination with other types of computer systems and program modules. The memory 302 includes one or more computer-readable media. According to one embodiment, the tuning subsystem 102, the DVR subsystem 104, and the control logic & UI 106 may be stored locally on computing device 300. Memory 302 thus may store the computer-executable instructions that, when executed by processor 304, provide the content as described above with reference to FIGS. 1-2.

In various embodiments, the memory 302 is implemented in various ways. For example, the memory 302 can be implemented as various types of computer-readable media. According to embodiments, the term computer-readable media includes two different types of media including communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific Integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 is a video expansion card. In another example, the video interface 312 is integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 communicates with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 includes a set of software instructions that, when executed by the processing system 304, cause the computing device 300 to provide an operating system that coordinates the activities and sharing of resources of the computing device 300. The memory 302 also stores one or more application programs 322 that, when executed by the processing system 304, cause the computing device 300 to provide applications to users, for example, one or more components of the substitution matching and control system 100. The memory 302 also stores one or more utility programs 324 that, when executed by the processing system 304, cause the computing device 300 to provide utilities to other software programs. Embodiments of the present invention may be utilized in various distributed computing environments where tasks are performed by remote processing devices that are linked through a communications network in a distributed computing environment.

FIGS. 4A-4B illustrate a suitable mobile computing environment, for example, a mobile computing device 400, a mobile phone/smart phone 110, a tablet/slate computer 114, a laptop/personal computer 112, and the like, with which embodiments may be practiced. The mobile computing device 400 is illustrative of any suitable device operative to send, receive and process wireless communications according to embodiments of the present invention. A display screen 405 is operative for displaying a variety of information such as information about incoming and outgoing communications, as well as, a variety of data and displayable objects, for example, text, alphanumeric data, photographs, and the like.

Data input to the device 400 may be performed via a variety of suitable means, such as, touch screen input via the display screen 405, keyboard or keypad input via a data entry area 410, key input via one or more selectable buttons or controls 415, voice input via a microphone 418 disposed on the device 400, photographic input via a camera 422 functionality associated with the mobile computing device, or any other suitable input means. Data may be output via the device 400 via any suitable output means, including but not limited to, display on the display screen 405, audible output via an associated speaker 430 or connected earphone system, vibration module for providing tactile output, and the like.

Referring now to FIG. 4B, operational unit 435 is illustrative of internal operating functionality of the mobile computing device 400. A processor 440 is illustrative of a general purpose computer processor for processing incoming and outgoing data and communications and controlling operation of the device and associated software applications via a mobile computing device operating system. Memory 445 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the system 100 may be stored locally on mobile computing device 400.

Mobile computing device 400 may contain an accelerometer 455 for detecting acceleration, and can be used to sense orientation, vibration, and/or shock. Mobile computing device 400 may contain a global positioning system (GPS) receiver (e.g., GPS send/receive functionality) 460. A GPS system uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 450 include all required functionality, including onboard antennae, for allowing the device 400 to communicate with other communication devices and systems via a wireless network. Radio functions

450 may be utilized to communicate with a wireless or Wi-Fi-based positioning system to determine a device's 400 location.

FIG. 5 is a simplified block diagram illustrating a cable television services system 500 (hereafter referred to as "CATV") architecture providing an operating environment according to an embodiment. As can be appreciated, a CATV architecture is but one of various types of systems that may be utilized to provide substituted VOD content. Referring now to FIG. 5, digital and analog video programming, information content and interactive television services are provided via a hybrid fiber coax (HFC) network 115 to a television set 116 for consumption by a cable television/services system customer. As is known to those skilled in the art, HFC networks 115 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 115 allows for efficient bidirectional data flow between the client-side set top box 118 and a server-side application server 540.

The CATV system 500 is in the form of a distributed client-server computing system for providing video and data flow across the HFC network 115 between server-side services providers (e.g., cable television/services providers) via a server-side head end 150 and a client-side customer via a client-side set-top box (STB) 118 functionally connected to a customer receiving device, such as the television set 116. As is understood by those skilled in the art, modern CATV systems 500 may provide a variety of services across the HFC network 115 including traditional digital and analog video programming, telephone services, high speed Internet access, video-on-demand, and information services.

On the client side of the CATV system 500, digital and analog video programming and digital and analog data are provided to the customer's television set 116 via the set-top box (STB) 118. Interactive television services that allow a customer to input data to the CATV system 500 likewise are provided by the STB 118. As illustrated in FIG. 5, the STB 118 is a multipurpose computing device having a computer processor, memory, and an input/output mechanism. The input/output mechanism receives input from server-side processes via the HFC network 115 and from customers via input devices such as the remote control device 528, keyboard 530, or other computing device, such as a tablet/slate computer 114, mobile phone/smart phone 110, etc. The remote control device 528 and the keyboard 530 may communicate with the STB 118 via a suitable communication transport such as the infrared connection 532. The STB 118 also includes a video processor for processing and providing digital and analog video signaling to the television set 116 via a cable communication transport 534. A multi-channel tuner is provided for processing video and data to and from the STB 118 and the server-side head end system 150, described below.

The STB 118 also includes an operating system 522 for directing the functions of the STB 118 in conjunction with a variety of client applications 525. For example, if a client application 525 requires a news flash from a third-party news source to be displayed on the television set 116, the operating system 522 may cause the graphics functionality and video processor of the STB 118, for example, to output the news flash to the television set 116 at the direction of the client application 525 responsible for displaying news items. According to embodiments, the operating system 522 may include one or more components of system 100 as described herein.

Because a variety of different operating systems 522 may be utilized by a variety of different brands and types of set-top boxes, a middleware layer 524 may be provided to allow a given software application to be executed by a variety of different operating systems. According to an embodiment, the middleware layer 524 may include a set of application programming interfaces (APIs) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 118. The middleware layer 542 of the server-side application server and the middleware layer 524 of the client-side STB 118 may format data passed between the client side and server side according to the Extensible Markup Language (XML).

According to one embodiment, the set top box 118 passes digital and analog video and data signaling to the television set 116 via a one-way communication transport 534. According to other embodiments, two-way communication transports may be utilized, for example, via high definition multimedia (HDMI) ports. The STB 118 may receive video and data from the server side of the CATV system 500 via the HFC network 115 through a video/data downlink and data via a data downlink. The STB 118 may transmit data from the client side of the CATV system 500 to the server side of the CATV system 500 via the HFC network 115 via one data uplink. The video/data downlink is an "in band" downlink that allows for digital and analog video and data signaling from the server side of the CATV system 500 through the HFC network 115 to the set top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 5, between the HFC network 115 and the set top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set top box 118 and the server-side application server 540 is typically passed through the "out of band" data links. Alternatively, an "in band" data carousel may be positioned in an "in band" channel into which a data feed may be processed from the server-side application server 540 through the HFC network 115 to the client-side STB 118. Operation of data transport between components of the CATV system 500, described with reference to FIG. 5, is well known to those skilled in the art.

Referring still to FIG. 5, the head end 150 of the CATV system 500 is positioned on the server side of the CATV system and includes hardware and software systems responsible for originating and managing content for distributing through the HFC network 115 to client-side STBs 118 for presentation to customers via television sets 116. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set top box 118 via the HFC network 115. As described above with reference to the set top box 118, the application server 540 includes a middleware layer 542 for processing and preparing data from the head end of the CATV system 500 for receipt and use by the client-side set-top box 118. For example, the application server 540 via the middleware layer 542 may obtain data from third-party services 546 via the Internet 121 for transmitting to a customer through the HFC network 115 and the set top box 118. For example, content metadata a third-party content provider service may be downloaded by the application server via the Internet 121. When the application server 540 receives the downloaded content metadata, the middleware layer 542 may be utilized to format the content metadata for receipt and use by the set top box 118. Therefore, content metadata may be sent and categorized based on the availability to the customer's program guide data.

According to one embodiment, data obtained and managed by the middleware layer 542 of the application server 540 is formatted according to the Extensible Markup Language and is passed to the set top box 118 through the HFC network 115 where the XML-formatted data may be utilized by a client application 525 in concert with the middleware layer 524, as described above. As should be appreciated by those skilled in the art, a variety of third-party services data, including news data, weather data, sports data and other information content may be obtained by the application server 540 via distributed computing environments such as the Internet 121 for provision to customers via the HFC network 115 and the set top box 118.

According to embodiments, the application server 540 obtains customer support services data, including billing data, information on customer work order status, answers to frequently asked questions, services provider contact information, and the like from data services 560 for provision to the customer via an interactive television session. As illustrated in FIG. 5, the services provider data services 560 include a number of services operated by the services provider of the CATV system 500 which may include data on a given customer.

A billing system 562 may include information such as a customer's name, street address, business identification number, Social Security number, credit history, and information regarding services and products subscribed to by the customer. According to embodiments, the billing system 562 may also include billing data for services and products subscribed to by the customer for bill processing, billing presentment and payment receipt.

A customer information database 568 may include general information about customers such as place of employment, business address, business telephone number, and demographic information such as age, gender, educational level, and the like. The customer information database 568 may also include information on pending work orders for services or products ordered by the customer. The customer information database 568 may also include general customer information such as answers to frequently asked customer questions and contact information for various service provider offices/departments. As should be understood, this information may be stored in a variety of disparate databases operated by the cable services provider.

Referring still to FIG. 5, web services system 550 is illustrated between the application server 540 and the data services 560. According to embodiments, web services system 550 serves as a collection point for data requested from each of the disparate data services systems comprising the data services 560. According to embodiments, when the application server 540 requires customer services data from one or more of the data services 560, the application server 540 passes a data query to the web services system 550. The web services system formulates a data query to each of the available data services systems for obtaining any required data for a requesting customer as identified by a set-top box identification associated with the customer. The web services system 550 serves as an abstraction layer between the various data services systems and the application server 540. That is, the application server 540 is not required to communicate with the disparate data services systems, nor is the application server 540 required to understand the data structures or data types utilized by the disparate data services systems. The web services system 550 is operative to communicate with each of the disparate data services systems for obtaining necessary customer data. The customer data obtained by the web services system is assembled and is returned to the application server 540 for ultimate processing via the middleware layer 542, as described above.

An authentication system 566 may include information such as secure user names, subscriber profiles, subscriber IDs, and passwords utilized by customers for access to network services. As should be understood by those skilled in the art, the disparate systems 562, 564, 566, 568 may be integrated or provided in any combination of separate systems, wherein FIG. 5 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method comprising:
   creating a virtual DVR from a local DVR and a network DVR, wherein the local DVR is a legacy DVR independent of the network DVR, and wherein the local DVR and the network DVR are synchronized together by:
   receiving an indication of a request from a user to record a video content item on only one of the local DVR or the network DVR where the video content item has yet to be recorded onto both of the local DVR and the network DVR;
   in response to receiving the indication of the request to record the video content item on one of the local DVR or the network DVR:
   using a virtual DVR synchronization middleware layer from a centralized system controller to control synchronization of the request from the user and to simultaneously record the video content item on both the local DVR and the network DVR, and thereby creating synchronized catalog data and metadata on both the local DVR and the network DVR, wherein when the request to record the video content item is received by a device in communication with the local DVR, simultaneously communicating the request to record the video content item with the network DVR, and when the request to record the video content item is received by an Internet Protocol device in communication with the network DVR, simultaneously communicating the request to record the video content item with the local DVR;
   receiving an indication to play the recorded content item from the local DVR, and using the virtual DVR synchronization middleware layer to determine that the recorded content items are precluded from being played from the local DVR and, in response, utilizing the virtual DVR to play the recorded content item from the network DVR; and
   dynamically inserting advertisements in the recorded content at the time of playback, wherein the advertisements are tailored to the playback including time of viewing and location.

2. The method of claim 1, wherein recording the video content item on both the local DVR and the network DVR comprises independently and simultaneously recording the video content item on the local DVR and the network DVR.

3. The method of claim 1, wherein a device in communication with the local DVR comprises a set top box.

4. The method of claim 1, wherein an Internet Protocol (IP) device in communication with the network DVR comprises one or more of:
   a mobile phone;
   a computer;
   a computing device capable of displaying IP video;
   a computing device capable of converting an IP video for display; or
   a tablet computing device.

5. The method of claim 1, further comprising:
   receiving an indication of a request to play the video content item;
   if the request to play the video content item is received from a device in communication with the local DVR, playing the requested video content item from the local DVR;
   if the request to play the video content item is received from an IP device in communication with the network DVR, playing the requested video content item from the network DVR; and
   synchronizing the data and metadata between the local DVR and the network DVR.

6. The method of claim 5, wherein synchronizing the data and metadata between the local DVR and the network DVR comprises synchronizing the data and the metadata associated with one or more of:
   deletion of a video content item;
   Response to Office Action mailed Jun. 25, 2019 bookmarks;
   parental controls;
   recording settings;
   upcoming recording requests;
   video content item metadata;
   a requesting user; or
   viewing history data.

7. The method of claim 6, wherein synchronizing the data and the metadata on deletion of a video content item comprises:
   receiving a request to delete a video content item; and
   determining if the request to delete a video content item is received from a device in communication with the local DVR or the network DVR;
   if the request to delete a video content item is received from a device in communication with the local DVR, deleting the video content item in the local DVR; or
   if the request to delete a video content item is received from a device in communication with the network DVR, deleting the video content item in the local DVR and the network DVR.

8. A system for creating a virtual DVR from a synchronized local DVR and network DVR, the system comprising:
   a centralized system controller having a virtual DVR synchronization middleware layer;
   a memory storage;
   an advertisement platform including a rules engine; and
   one or more processing unit(s) coupled to the memory storage, wherein the one or more processing unit(s) are operable to:
   create a virtual DVR from a local DVR and a network DVR, wherein the local DVR is a legacy DVR independent of the network DVR, and synchronize the local DVR and the network DVR together to create the virtual DVR across an HFC network by:
   receiving an indication of a request from a user to record a video content item on only one of the local DVR or the network DVR where the video content item has yet to be recorded onto the both of local DVR and the network DVR;
   in response to receiving the indication of the request to record the video content item on one of the local DVR or the network DVR:

using the virtual DVR synchronization middleware layer from the centralized system controller to control synchronization of the request from the user and to simultaneously record the video content item in both the local DVR and the network DVR, and thereby create synchronized catalog data and metadata on both the local DVR and the network DVR, wherein when the request to record the video content item is received by a device in communication with the local DVR, the one or more processors are operable to simultaneously communicate the request to record the video content item with the network DVR, and when the request to record the video content item is received by an Internet Protocol device in communication with the network DVR, the one or more processors are operable to simultaneously communicate the request to record the video content item with the local DVR;

receive an indication to play the recorded content item from the local DVR, and using the virtual DVR synchronization middleware layer to determine that the recorded content items are precluded from being played from the local DVR and, in response, utilize the virtual DVR to play the recorded content item from the network DVR; and utilizing the rules engine in the advertisement platform to dynamically insert advertisements in the recorded content at the time of playback, wherein the advertisements are tailored to the playback including time of viewing and location.

9. The system of claim 8, wherein the one or more processors are further operable to:

receive an indication of a request to play the video content item;

if the request to play the video content item is received from a device in communication with the local DVR, play the requested video content item from the local DVR;

if the request to play the video content item is received from an IP device in communication with the network DVR, play the requested video content item from the network DVR; and synchronize the data and metadata between the local DVR and the network DVR.

10. The system of claim 9, wherein in synchronizing the data and metadata between the local DVR and the network DVR, the one or more processors are operable to synchronize the data and the metadata associated with one or more of:

deletion of a video content item;
bookmarks;
parental controls;
recording settings;
upcoming recording requests;
video content item metadata;
a requesting user; or
viewing history data.

11. The system of claim 10, wherein in synchronizing the data and the metadata associated with deletion of a video content item, the one or more processors are operable to:

receive a request to delete a video content item; and
determine if the request to delete a video content item is received from a device in communication with the local DVR or the network DVR;

if the request to delete a video content item is received from a device in communication with the local DVR, delete the video content item in the local DVR; or if the request to delete a video content item is received from a device in communication with the network DVR, delete the video content item in the local DVR and the network DVR.

12. A computer-readable storage device which stores a set of instructions which when executed performs a method comprising:

creating a virtual DVR from a local DVR and a network DVR, wherein the local DVR is a legacy DVR independent of the network DVR, and wherein the local DVR and the network DVR are synchronized together by:

receiving an indication of a request from a user to record a video content item on only one of the local DVR or the network DVR where the video content item has yet to be recorded onto both the local DVR and the network DVR;

in response to receiving the indication of the request to record the video content item on one of the local DVR or the network DVR:

using a virtual DVR synchronization middleware layer from a centralized system controller to control synchronization of the request and to simultaneously record the content item in both the local DVR and the network DVR, and thereby creating synchronized catalog data and metadata on both the local DVR and the network DVR, wherein when the request to record the video content item is received by a device in communication with the local DVR, simultaneously communicating the request to record the video content item with the network DVR, and when the request to record the video content item is received by an Internet Protocol device in communication with the network DVR, simultaneously communicating the request to record the video content item with the local DVR;

receiving an indication to play the recorded content item from the local DVR, and using the virtual DVR synchronization middleware layer to determine that the recorded content items are precluded from being played from the local DVR and, in response, utilizing the virtual DVR to play the recorded content item from the network DVR; and dynamically inserting advertisements in the recorded content at the time of playback, wherein the advertisements are tailored to the playback including time of viewing and location.

13. The computer-readable storage device of claim 12, further comprising:

receiving an indication of a request to play the video content item;

Response to Office Action mailed Jun. 25, 2019 if the request to play the video content item is received from a device in communication with the local DVR, playing the requested video content item from the local DVR;

if the request to play the video content item is received from an IP device in communication with the network DVR, playing the requested video content item from the network DVR; and synchronizing the data and metadata between the local DVR and the network DVR.

14. The computer-readable storage device of claim 13, wherein synchronizing the data and metadata between the local DVR and the network DVR comprises synchronizing the data and the metadata associated with one or more of:
   deletion of a video content item;
   bookmarks;
   parental controls;
   recording settings;
   upcoming recording requests;
   video content item metadata;
   a requesting user; or
   viewing history data.

15. The computer-readable storage device of claim 14, wherein synchronizing the data and the metadata on deletion of a video content item comprises:
   receiving a request to delete a video content item; and
   determining if the request to delete a video content item is received from a device in communication with the local DVR or the network DVR;
   if the request to delete a video content item is received from a device in communication with the local DVR, deleting the video content item from the local DVR; or
   if the request to delete a video content item is received from a device in communication with the network DVR, deleting the video content item from the local DVR and the network DVR.

* * * * *

UNITED STATES PATENT AND TRADEMARK OFFICE
CERTIFICATE OF CORRECTION

PATENT NO. : 10,623,817 B1  
APPLICATION NO. : 14/162359  
DATED : April 14, 2020  
INVENTOR(S) : Douglas D. Gravino Page 1 of 1

It is certified that error appears in the above-identified patent and that said Letters Patent is hereby corrected as shown below:

In the Specification

Column 5
Line 60, "τ" should be deleted.
Line 67, "recording" should read --recording.--.

Column 9
Line 26, "be a an LCD" should read --be a LCD--.

In the Claims

Column 16
Line 24, Claim 6 "Response to Office Action mailed Jun. 25, 2019" should be deleted.

Column 18
Line 56, Claim 13 "Response to Office Action mailed Jun. 25, 2019" should be deleted.

Signed and Sealed this
Tenth Day of November, 2020

Andrei Iancu
*Director of the United States Patent and Trademark Office*